United States Patent
Van Rens

(10) Patent No.: US 12,151,465 B2
(45) Date of Patent: Nov. 26, 2024

(54) METHOD OF PRINTING

(71) Applicant: Canon Production Printing Holding B.V., Venlo (NL)

(72) Inventor: Nicolaas T. A. Van Rens, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 256 days.

(21) Appl. No.: 17/206,919

(22) Filed: Mar. 19, 2021

(65) Prior Publication Data
US 2021/0309037 A1 Oct. 7, 2021

(30) Foreign Application Priority Data

Apr. 1, 2020 (EP) .................................. 20167525

(51) Int. Cl.
 *B41M 7/00* (2006.01)
 *B41J 11/00* (2006.01)
 *B41M 5/00* (2006.01)

(52) U.S. Cl.
 CPC .......... *B41J 11/002* (2013.01); *B41M 5/0017* (2013.01); *B41M 7/009* (2013.01)

(58) Field of Classification Search
 CPC ..... B41M 7/009; B41M 5/0017; B41J 11/002
 See application file for complete search history.

(56) References Cited

U.S. PATENT DOCUMENTS

| 6,443,568 B1 | 9/2002 | Askeland et al. |
| 2010/0003408 A1* | 1/2010 | Yanagi ................. C09D 133/10 427/256 |
| 2010/0208021 A1* | 8/2010 | Hori .................... G03G 15/2064 347/102 |
| 2013/0162712 A1* | 6/2013 | Yamanobe ............. B41J 11/002 347/16 |
| 2013/0176369 A1* | 7/2013 | Gotou .................. C09D 11/322 347/100 |
| 2014/0308447 A1* | 10/2014 | Sarkisian ............... C09D 5/002 427/261 |
| 2015/0360480 A1 | 12/2015 | Bugner et al. |

(Continued)

FOREIGN PATENT DOCUMENTS

| EP | 3 146 002 A1 | 3/2017 |
| EP | 3 363 644 A1 | 8/2018 |

(Continued)

OTHER PUBLICATIONS

European Search Report, issued in EP Application No. 20 16 7525, dated Sep. 21, 2020.
European Search Report for EP 21 16 2014, dated Aug. 23, 2021.

*Primary Examiner* — Justin Seo
*Assistant Examiner* — Kendrick X Liu
(74) *Attorney, Agent, or Firm* — Birch, Stewart, Kolasch & Birch, LLP

(57) ABSTRACT

A method of printing for improving print quality includes applying a layer of a pre-treatment liquid to a surface of a print substrate; printing an image on top of the layer of the pre-treatment liquid; pre-drying a printed print substrate obtained in the printing step at a temperature of between 30 and 50 degrees Celsius for 2-6 seconds; and drying of and/or fixation of the image on the print printed substrate obtained after the pre-drying step. A printing system is disclosed for performing the method.

10 Claims, 2 Drawing Sheets

(56) References Cited

U.S. PATENT DOCUMENTS

| | | | |
|---|---|---|---|
| 2016/0129702 A1* | 5/2016 | Katagami | B41J 11/00222 |
| | | | 347/102 |
| 2016/0185992 A1* | 6/2016 | Sarkisian | B41M 7/0018 |
| | | | 524/400 |
| 2016/0319146 A1 | 11/2016 | Prasad et al. | |
| 2017/0028688 A1 | 2/2017 | Dannhauser et al. | |
| 2018/0354275 A1* | 12/2018 | Milini | B41J 11/0015 |
| 2018/0370225 A1* | 12/2018 | Huijbers | B41J 11/0015 |
| 2019/0061382 A1 | 2/2019 | Okuda et al. | |
| 2019/0168516 A1* | 6/2019 | Nakagawa | B41M 7/009 |
| 2019/0375223 A1 | 12/2019 | Rahimi et al. | |
| 2020/0224051 A1* | 7/2020 | Doumaux | B41M 5/0011 |
| 2020/0391533 A1* | 12/2020 | Gotou | C09D 11/54 |
| 2021/0002502 A1* | 1/2021 | Kawai | C09D 11/54 |
| 2021/0060993 A1* | 3/2021 | Hayamizu | B41M 5/0017 |
| 2022/0143998 A1* | 5/2022 | Miyato | C09D 11/107 |

FOREIGN PATENT DOCUMENTS

| | | |
|---|---|---|
| EP | 3 442 808 A1 | 2/2019 |
| WO | WO 2015/177182 A1 | 11/2015 |
| WO | WO 2017/178600 A1 | 10/2017 |

\* cited by examiner

METHOD OF PRINTING

FIELD OF THE INVENTION

The present invention relates to a method of printing with a latex inkjet ink, a pre-treatment liquid and print medium having low ink absorption for improving print quality and robustness and a printing system for performing the method.

BACKGROUND ART

Printing methods comprising the steps of application of layer of pre-treatment liquid and subsequently printing an image on top of said layer of pre-treatment liquid followed by a drying/fixation step at high temperature are known in the art. It is also known in the art that drying and/or fixating of a printed image is performed in a drying/fixation module arranged downstream a conditioned image formation module, for example in the Océ VarioPrint i300 printing system. In such known printing systems, there is arranged a transporting means for transporting printed print substrates from the image formation module to the drying/fixation module. In EP 3442808 A1 it is disclosed that the printed matter transport between an image formation module and a drying/fixation module is performed in a conditioned environment, wherein the relative humidity is controlled to at least 50% and wherein the length of the transport path is represented by equation 1:

$$L \geq (v_{printing}/60 * t_{abs} * W_{image}) \quad \text{equation 1}$$

wherein:
$v_{printing}$=the printing speed in images per minute (ipm)
$t_{abs}$=print substrate and ink set dependent absorption time (s) which is 1000 ms
$W_{image}$=image width (m)

A disadvantage of such printing methods and systems is that in particular for printing methods wherein a pre-treatment liquid (also known as primer) is used and wherein print substrates having a relatively low porosity (e.g. off-set coated media) at relatively high printing speeds (>200-400 A4 images per minute) show an inferior print quality, in particular mud cracking which causes undesired color shift (explained in the detailed description) and inferior drying robustness is obtained. These print artefacts are considered to be caused by limited absorption of liquids originating from the pre-treatment composition and ink compositions into the print substrates. These artifacts can be insufficiently solved by using a conditioned transport module as disclosed and claimed in EP 3442808 A1. In general, it is stated that when a large amount of liquids is applied to a substrate, a conditioned transport module does not suffice for balancing absorption of liquids into the substrate and evaporation of said liquids to the environment.

It is an object of the present invention to overcome or at least mitigate said disadvantage and provide a method and system wherein the absorption of liquids originating from mainly the pre-treatment composition and the ink compositions into the print substrate is improved, such that printed matter with an improved print quality, in particular reduced color shift caused by mud cracking and improved drying robustness at high printing speeds can be obtained.

SUMMARY OF THE INVENTION

This object can be obtained by providing a method of printing for improving ink absorption into a printed print substrate by preventing evaporation, the method comprising the steps of:

a. applying a layer of an aqueous pre-treatment liquid to a surface of a porous print substrate
b. directly after step a printing an image with one or more aqueous ink compositions on top of the wet layer of the aqueous pre-treatment liquid;
c. pre-drying a printed print substrate obtained in step b at a temperature of between 30 and 50 degrees Celsius for 2-6 seconds, preferably between 3-6 seconds;
d. directly after step c drying of and/or fixation of the image on the printed print substrate obtained in step c Without wanting to be bound to any theory, it is believed that a low residual amount of liquid on the surface of media before entering a drying/fixation stage is required to obtain an improved print quality and optimal (drying) robustness.

In a printing process without using a pre-treatment liquid layer, the residual amount of liquid is a result of evaporation of solvents (including water) present in the ink composition and absorption of ink constituents in the print substrate and all within 100-1000 ms. After this period of time, the ink composition has attained a high viscosity due to evaporation, which limits or even prevents further absorption, such that the residual amount of liquid on the surface of the printed print substrate is too high to obtain a satisfactory (drying) robustness.

Therefore, in order to further reduce the residual amount of liquid on the surface of the print substrate before entering a drying/fixation stage, evaporation of ink components should be prevented, in order to moderate the viscosity increase and hence to promote absorption of ink components into the print substrate.

In printing processes including the use of a pre-treatment liquid, the layer of pre-treatment liquid present underneath a printed image provides a barrier for liquids in the ink compositions to absorb. Hence under normal conditions the predominant drying mechanism of ink droplets is evaporation. Due to said evaporation ink droplets will shrink, such that in a dried/fixed state paper white becomes visible which induces unwanted color shift. In order to prevent this, the liquid barrier caused by the pre-treatment layer should be reduced first predominantly by absorption into the print substrate during which the ink droplets on top of the pre-treatment layer remain intact due to relative low temperature (virtually no evaporation of ink droplets occurs in this stage). After absorption of the pre-treatment layer into the print substrate, liquids originating from the ink compositions can absorb into the print substrate, hence preventing shrinkage of the ink droplets.

Inventors have found that in a printing process using pre-treatment liquid application followed by image formation, a pre-drying step at mild conditions, e.g. the temperature regime disclosed above and in claim 1 provides a reduction of the absorption barrier caused by the pre-treatment liquid layer predominantly by absorption and hence allows the liquids in the ink to sufficiently absorb into the print substrate such that shrinkage of the ink droplets is successfully prevented or mitigated. Drying times in a printing process including the use of a pre-treatment liquid according to the present invention will be longer than in a printing process without using a pre-treatment liquid layer, typically in the order of seconds and dependent on (a.o.) the drying conditions, the type of substrate and the types of pre-treatment and ink compositions. With this method, color shift is prevented or mitigated, and the print robustness is improved.

In an embodiment, the pre-drying step c is performed directly after the printing step b.

In an embodiment, the temperature in the pre-drying step is between 35 and 45 degrees Celsius.

In an embodiment the pre-drying step is carried out for 3-5 seconds.

In an embodiment, the porous print substrate comprises off-set coated media.

To further control the balance of absorption and evaporation, the relative humidity inside the pre-drying module can be controlled. A higher relative humidity further prevents evaporation in favor of absorption.

In another aspect the present invention pertains to a printing system for performing the method according to the present invention, the printing system comprising:

a pre-treatment application module;

an image formation module (1), arranged down-stream of the pre-treatment application module;

a pre-drying module (10) arranged down-stream of the image formation module (1); and a drying/fixation module (20) arranged down-stream of the pre-drying module (10) wherein the pre-drying module (10) is arranged between the image formation module (1) and the drying/fixation module (20), and wherein the pre-drying module (10) comprises a heater (12) arranged for heating a printed print substrate to a temperature of between 30 and 50 degrees Celsius, and wherein the pre-drying module (10) comprises a transporting means having a transport length of at least $L = v_{print} * t_{res}$, wherein $v_{print}$ is the printing speed (m/s) and $t_{res}$ is the residence time in the pre-drying module (1), which is in a range of 2-6 seconds.

In an embodiment, L is in a range of between 3-10 m.

In an embodiment, the transporting means comprises at least one transporting means selected from the group consisting of a transport belt, a transport roller and a transport drum.

In an embodiment, the transport path is arranged in a folded arrangement in the pre-drying module (10).

An additional advantage of this embodiment is that a folded transport path reduces the footprint of the pre-drying module, while providing the above described required residence time in the pre-drying module.

In an embodiment the pre-drying module comprises a temperature sensor and a controller arranged for controlling the temperature in the pre-drying module.

In an embodiment the pre-drying module comprises a relative humidity sensor and a control unit arranged for controlling the relative humidity in the pre-drying module. The control unit may comprise a generator for generating humid air (e.g. an evaporator)

BRIEF DESCRIPTION OF THE DRAWINGS

The present invention will become more fully understood from the detailed description given herein below and accompanying schematical drawings which are given by way of illustration only and are not limitative of the invention, and wherein.

DETAILED DESCRIPTION

Figure 1:
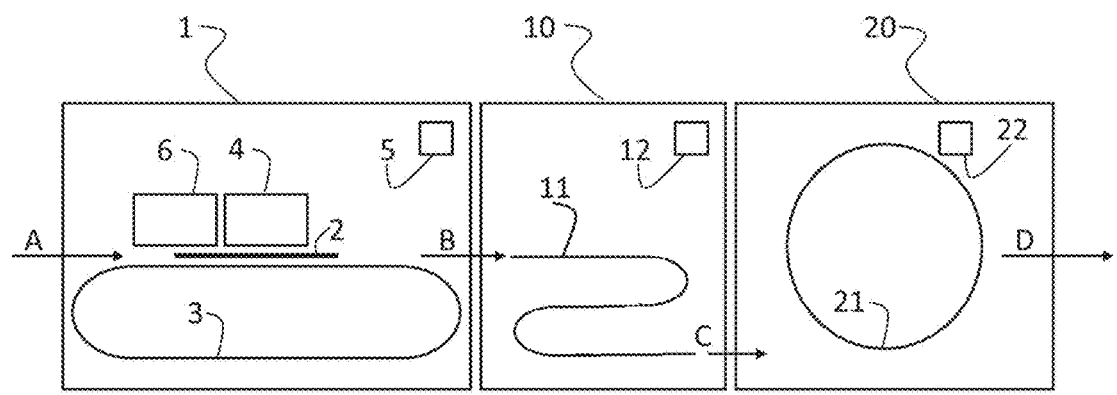
FIG. 1 shows a schematic representation of an inkjet printing system according to the second aspect of the present invention.

FIG. 1 shows a printing system according to the present invention, comprising a pre-treatment application module 6, an image formation module 1, a pre-drying module 10 and a drying/fixation module 20. In this particular example the pre-treatment application module 6 is comprised within the image formation module. The pre-treatment application module may comprise one or more (an array) of print heads arranged for applying a pre-treatment liquid. Alternatively, the pre-treatment application module 6 may be separated from the image formation module 1 and may comprise other liquid application devices, such as (annilox) rollers. For the purpose of the present invention, no drying step is performed between the application of the pre-treatment liquid and image formation. Hence, a wet-in-wet process is performed (i.e. wet ink on top of a wet pre-treatment layer). The image formation module 1 comprises a transporting means 3 arranged for transporting a print substrate 2 that has entered the printing module 1 (indicated with arrow A) underneath an image forming device 4 comprising ink jet print heads such that an image is printed on the pre-treated printing substrate. Hence the pre-treatment application module 6 is arranged upstream the image forming device 4. The image formation module further comprises a control system 5 for controlling environmental conditions inside the image formation module, for example temperature and (relative) humidity. By controlling a high (e.g. >70% RH) humidity, evaporation of ink is prevented or at least reduced.

Figures 2A, 2B:
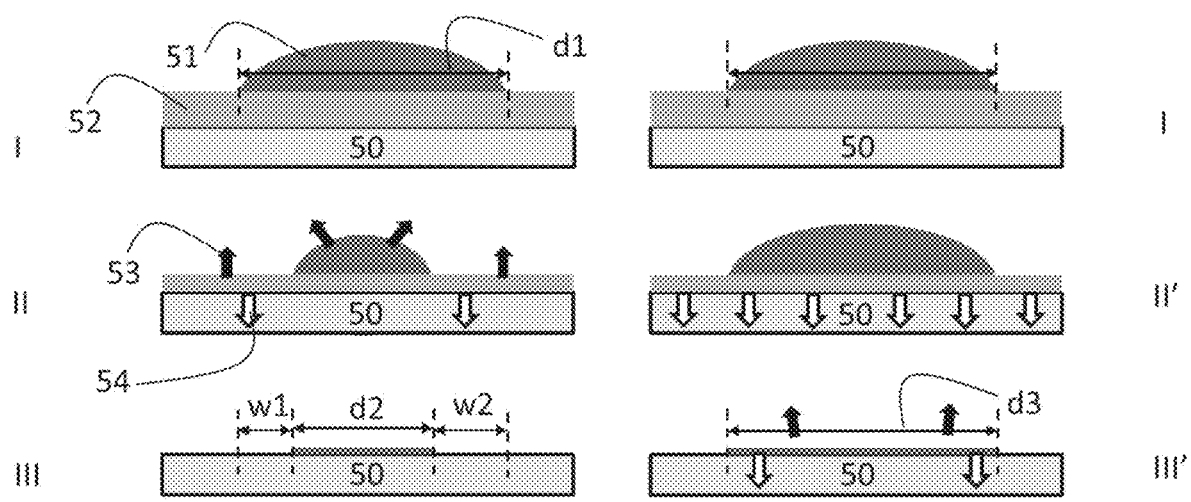
FIG. 2A shows a schematic representation of the drying process in a printing process without pre-drying.
FIG. 2B shows a schematic representation of the drying process in a printing process according to the present invention.

The pre-drying module 10 comprises a transporting means 11 that is arranged and adapted for transporting the printed print substrate from the image formation module 1 to the drying/fixation module 20 (indicated with arrows B and C respectively). The length of the transport path along the transporting means 11 is designed such that the residence time of a printed print substrate inside the pre-drying module is sufficient to promote absorption of the pre-treatment liquid and ink into the print substrate in order to obtain a state of pre-treatment and ink layer as shown in FIG. 2B. Because the absorption is also dependent on the type of print substrate and used ink set, a desired media range and ink set has to be selected and the optimal length of the transport path along transporting means 11 in the pre-treatment module has to be calculated. The required residence time in mild drying conditions is leading in specific design of the dryer and dependent on a.o. printing speed and absorption characteristics of the used print substrate(s). The required residence time for a wide range of porous substrates in combination with a wide range of aqueous pre-treatment compositions and aqueous ink compositions is between 2 and 6 seconds. The required length of the transport path can be calculated by using the desired printing speed as disclosed above (200-400 A4 images/min) and the required residence time range. The longest required transport path is determined by the highest printing speed and the longest required residence time: 400 A4 images/min (long edges as leading and trailing edges, meaning 0.21 m with per A4 image in the transport direction) equals a printing speed of 400*0.21/60=1.4 m/s (assuming no distance between subsequent A4 sheets). At a required residence time of 6 seconds, the length of the transport part should be 1.4*6=8.4 m. In the exemplified scenario as described above, the minimum length of the transport path is determined by the lowest printing speed and the shortest required residence time: 200*0.21/60*2=1.4 m. Therefore, the required length of the transport path must be calculated based on the desired printing speed and required residence time, which depends on the media range and used ink and pre-treatment liquid system. Hence the minimum length of the transport path in case the desired printing speed is 300 A4 images per minute at a required residence time of 2 seconds is 300*0.21/60*2=2.1 m. To reduce the size of the footprint of the pre-drying module 10, the transporting means 11 may be arranged in a folded way in the pre-drying module 10. In general, the required residence time at the desired mild drying conditions is considered to be an essential feature in the present invention. Required transport path length through the dryer is the product of the desired printing speed (m/s) and the required residence time (s). The present invention applies to both cut-sheet printing and continuous feed printing. The pre-treatment module further comprises a control system 12 for controlling environmental conditions inside the pre-treatment module, in particular temperature. The temperature inside the pre-treatment module 6 is controlled to a temperature in the window of between 30 and 50 degrees Celsius, in accordance with a printing process according to the present invention. Evaporation of liquids originating from the pre-treatment liquid and inks during transport of the printed print substrate is prevented or at least reduced. Optionally the (relative) humidity can be controlled. The drying/fixation module 20 comprises a transporting means 21, in this case a drum (rotating e.g. in a clockwise direction, not shown) and a drying/fixation means 22, for example comprising (radiation) heaters and air impingement modules. The printed print substrate leaves the drying/fixation module as indicated with arrow D. The printed print substrate may be further transported to a receiving tray, a post processing module (e.g. a folding module, a booklet making module or the like) or the printed print substrate may be turned and reintroduced in the image formation module 1 for duplex printing.

The transporting means in the image formation module, the pre-treatment module and the drying and fixing module may also comprise one or more drums, one or more transport belts, one or more transport rollers or a combination of the plural.

Methods for controlling the environmental conditions in the modules are known in the art and are not further discussed here.

It is noted that the embodiment shown in FIG. 1 is not limiting the scope of the present invention. The invention may for example also be implemented in a continuous feed printer using an ink jet printing technique. Also, duplex media transport paths may be implemented, which are not shown in FIG. 1.

FIGS. 2A and 2B show a schematic representation of the drying mechanisms that occur in a printing process without (2A) and with (2B) performing a pre-drying step at mild conditions, in particular low temperature, i.e. between 30 and 50 degrees Celsius.

FIG. 2A shows three stages in the drying process without pre-drying. Stage I represents the situation directly after application of a pre-treatment liquid layer 52 on top of a print substrate 50 and an image represented by a single ink droplet 51 having a diameter d1 and printed on top of the pre-treatment liquid layer 52. In stage II intense (high) heat (e.g. 2-4 seconds at 100° C.) is applied in order to dry and fix the image to the print substrate 50. The solid black arrows indicated with 53 indicated evaporation of liquids originating from both the pre-treatment composition and the ink compositions. Due to evaporation of liquids originating from the ink droplet, the ink droplet shrinks. The white arrows indicated with 54 indicated absorption of liquids into the print substrate 50. In final stage III all liquids have disappeared, either by evaporation or absorption into the print substrate. The realized dot-size equals d2, which is significantly smaller than the original droplet diameter d1. This leaves white areas around the ink dot, as indicated by w1 and w2.

FIG. 2B also shows three stages of the drying process, in accordance with a method of the present invention. Stage I is the same as shown in FIG. 2A and described above. Due to mild pre-drying conditions (e.g. temperature between 30 and 50 degrees Celsius), in stage II' absorption mainly of the pre-treatment liquid layer is significantly promoted as indicated by the open (white arrows). Almost no evaporation occurs in stage II' (represented by the absence of sold black arrows). Therefore, no shrinkage of the ink droplet occurs. In final stage III' high heat conditions are applied to remove remaining liquid fraction by absorption and evaporation. The realized dot-size equals d3, which is similar to the original drop diameter d1. The white areas around the ink dot will be significantly reduced, in this particular example to zero additional paper white.

EXAMPLES

Materials

The print media used in the example is: UPM Finesse Matt 115 g/m$^2$.

The pre-treatment liquid used in the example is: ProStream ColorGrip (Canon Production Printing)

The ink used in the examples was: ProStream CP70/YP70.

EXPERIMENTAL METHODS

Figure 3:
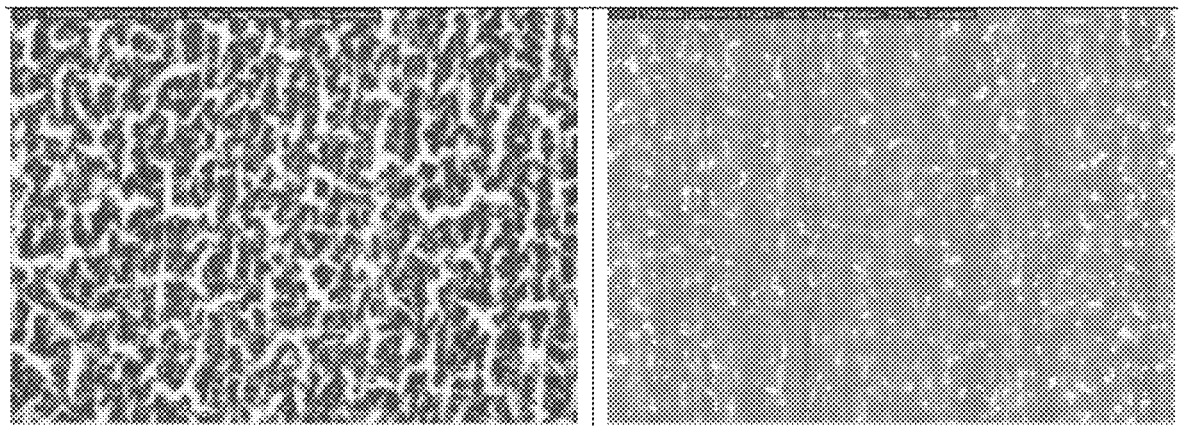
FIG. 3 shows photographs showing the mud cracking effect in a printing process without pre-drying (left hand side) and the reduction of mud cracking effect in a printing process according to the present invention (right hand side).
Figure 4:
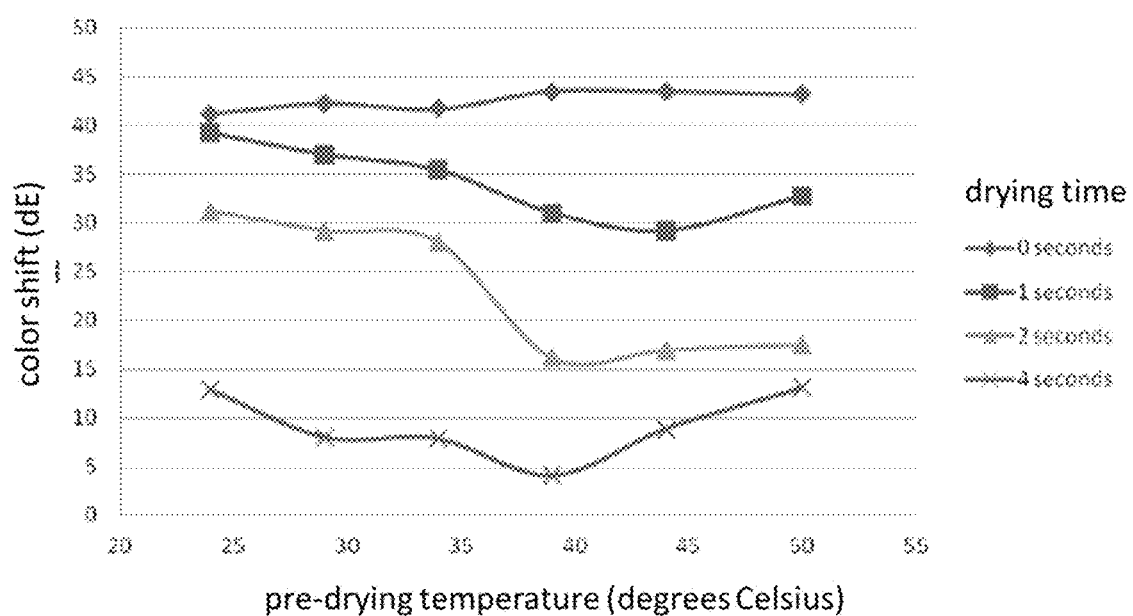
FIG. 4 shows a graph representing the color shift as a result of pre-drying as a function of temperature (x-axis) and as a function of residence time in the pre-drying module.

Prints with 200% coverage with ink were produced with a standard printing process: 1) application of 100% pre-treatment liquid (inkjet printing); 2) printing an area of 10 cm by 10 cm with 100% coverage Cyan and 100% coverage Yellow, resulting in green; 3) fixation at high temperature (100° C.):

The results are shown in the left-hand photograph in FIG. 3 (which is a 225 times magnified microscopic image of 1.5 mm×1 mm of the printed surface) and in the top graph of FIG. 4 (i.e., 0 seconds pre-drying).

Under the same conditions pre-drying is introduced. As can be seen in FIG. 4 at different pre-drying times (residence time in the pre-drying unit), 1, 2 and 4 seconds respectively. It can be deduced from FIG. 4 that the color shift (dE) is reduced when pre-drying is introduced. It can also be deduced that the color shift is the smallest for 4 seconds pre-drying at 40 degrees Celsius (for this combination of ink/pre-treatment liquid/substrate). The result of pre-drying under these conditions is shown in the right-hand photograph of FIG. 3, which clearly shows that less paper white is visible and hence proves the drying model as shown in FIG. 2B.

The color shift (dE) is determined by performing a color measurement with X-Rite color measurement equipment and determining the LAB parameters of both a print obtained with high heat fixation and a print obtained with the method according to the present invention including pre-drying at mild conditions (i.e. multi-stage drying). The color difference (shift) between the print obtained with high heat and obtained with multi-stage drying (dE) is determined in accordance with known CIELAB methods.

The method used to produce the images of the printed matter as shown in FIGS. 3A and 3B is a microscopic method using a DinoLite digital Microscope premier with a 225 magnification. The photo's in FIG. 3 represent a printed surface of 1.5 mm×1 mm.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims is herewith disclosed.

Further, the terms and phrases used herein are not intended to be limiting; but rather, to provide an understandable description of the invention. The terms "a" or "an", as used herein, are defined as one or more than one.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of printing for improving print quality, the method comprising the steps of:
   a. applying a layer of an aqueous pre-treatment liquid to a surface of a porous print substrate;
   b. directly after step a, printing an image with one or more aqueous ink compositions on top of the wet layer of the aqueous pre-treatment liquid;
   c. pre-drying a printed print substrate obtained in step b at a temperature of between 30 and 50 degrees Celsius for 2-6 seconds; and
   d. directly after step c, drying of and/or fixation of the image on the printed print substrate obtained in step c.

2. The method according to claim 1, wherein the temperature in the pre-drying step is between 35 and 45 degrees Celsius.

3. The method according to claim 1, wherein the pre-drying step is carried out for 3-5 seconds.

4. The method according to claim 1, wherein the porous print substrate comprises off-set coated media.

5. A printing system for performing the method according to claim 1, the printing system comprising:
   a pre-treatment application module;
   an image formation module, arranged down-stream of the pre-treatment application module;
   a pre-drying module arranged down-stream of the image formation module; and
   a drying/fixation module arranged down-stream of the pre-drying module,
   wherein the pre-drying module is arranged between the image formation module and the drying/fixation module,
   wherein the pre-drying module comprises a heater arranged for heating a printed print substrate to the temperature of between 30 and 50 degrees Celsius, and
   wherein the pre-drying module comprises a transporting means having a transport length of at least $L=v_{print}*t_{res}$, wherein $v_{print}$ is the printing speed (m/s) and $t_{res}$ is the residence time in the pre-drying module, which is in the range of 2-6 seconds.

6. The printing system according to claim 5, wherein L is in a range of 3-10 m.

7. The printing system according to claim 5, wherein the transporting means comprises at least one transporting means selected from the group consisting of a transport belt, a transport roller and a transport drum.

8. The printing system according to claim 5, wherein the transporting means is arranged in a folded arrangement in the pre-drying module.

9. The printing system according to claim 5, wherein the pre-drying module comprises a temperature sensor and a controller arranged for controlling the temperature in the pre-drying module.

10. The method according to claim 1, wherein the drying of and/or fixation of the image is performed at a temperature greater than the temperature of the pre-drying.

* * * * *